United States Patent Office 3,553,167
Patented Jan. 5, 1971

3,553,167
POLYESTERS
Hermann Schnell, Krefeld-Urdingen, Volker Böllert, Hamburg, and Gerhard Fritz, Krefeld-Bockum, Germany, assignors to Farbenfabriken Bayer Aktiengesellschaft, Leverkusen, Germany, a corporation of Germany
No Drawing. Continuation of application Ser. No. 476,143, July 30, 1965, which is a continuation-in-part of application Ser. No. 99,034, Mar. 29, 1961. This application Mar. 18, 1968, Ser. No. 714,116
Claims priority, application Germany, Mar. 30, 1960, F 30,871
Int. Cl. C08g *17/003, 17/13*
U.S. Cl. 260—47                                9 Claims

ABSTRACT OF THE DISCLOSURE

A process for preparing polymers by reacting a dicarboxylic acid, a diol or an hydroxycarboxylic acid and a diaryl carbonate in a ratio of 1 mol of the dicarboxylic acid, at least 1 mol of the diol or the hydroxycarboxylic acid and at least 2 mols of the diaryl carbonate.

---

This invention relates generally to the praparation of polyesters and more particularly to an improved method for making high molecular weight linear polyesters, and is a continuation of copending application Ser. No. 476,143, now abandoned, which is in turn a continuation-in-part of our copending application, Ser. No. 99,034, filed Mar. 29, 1961, now abandoned.

It has been proposed to prepare polyesters by reaction between a polyhydric alcohol and a polycarboxylic acid. In such a process, the hydroxyl groups of the polyhydric alcohol react with the carboxyl groups of the carboxylic acid to form ester linkages and water. This water must later be separated from the polyester. It has been difficult to make polyesters of high molecular weight by such a process particularly if an aromatic polyhydroxy compound is used instead of a polyhydric alcohol.

It has also been proposed to prepare polyesters by reacting a dicarboxylic acid chloride with an organic dihydroxy compound such as an aromatic dihydroxy compound or a polyhydric alcohol to prepare high molecular weight polyesters. In such a process, hydrochloric acid is formed so an aqueous solution of an alkali or tertiary amine is used as an acid binding agent. Phosgene and dicarboxylic acid chlorides can be reacted with an organic dihydroxy compound to produce a polyester which will contain dicarboxylic acid and carbonic acid residues. It has been disclosed that the reaction of a dicarboxylic acid and phosgene with an organic dihydroxy compound is advantageously conducted in the presence of a tertiary amine. In all of these processes, using a dicarboxylic acid chloride or phosgene, hydrogen chloride is split off and alkali metal oxides or tertiary amine hydrogen chlorides are formed. These materials must be separated from the polyester before it can be used for most purposes.

It is therefore an object of this invention to provide a process for making high molecular weight linear polyesters which process does not produce hydrogen chloride and is therefore devoid of the foreging disadvantages. Another object of the invention is to provide a method for making high molecular weight linear polyesters from an organic dihydroxy compound and a dicarboxylic acid which is adaptable to the production of polyesters from aromatic dihydroxy compounds. A still further object of the invention is to provide a method for making a polyester from an organic dihydroxy compound and a dicarboxylic acid which does not require the separation of an alkali metal chloride, a hydrogen chloride of a tertiary amine or water.

The foregoing objects and others are accomplished in acordance with this invention, generally speaking, by providing a process for making a high molecular weight linear polyester or polyester-polycarbonate resin wherein a dicarboxylic acid, an organic compound having two hydroxyl groups, which includes ω-hydroxy carboxylic acids, and a diaryl carbonate are heated together in a ratio of 1 mol of the dicarboxylic acid, at least 1 mol of the organic compounnd containing two hydroxyl groups and at least 2 mols of the diaryl carbonate. Generally, the precise ratios which are preferably used are 1 mol of the dicarboxylic acid, 1 mol of the organic compound containing two hydoxyl groups and 2 mols of the diaryl carbonate to obtain a polyester, or the ratio of 1 mol of the dicarboxylic acid, more than 1 mol of the organic compound containing two hydroxyl groups and more than 2 mols of the diaryl carbonate to prepare a polyester-polycarbonate resin, the latter ratio requiring that above the 1:2 ratio defined in the former ratio for the dihydroxy compound and the diaryl carbonate, the ratio between the organic compound containing two hydroxyl groups and the diaryl carbonate is 1:1. In such an instance, it will become apparent that the quantities of dihydroxy compound and diaryl carbonate are present in a ratio such that $$\left(\frac{\text{total mols dihydroxy compound}-1}{\text{total mols diaryl carbonate}-2}\right) \text{ equals } 1/1$$

The reaction takes place with the simultaneous formation of phenol and carbon dioxide, and is preferably conducted in the presence of a catalytic amount of an alkali metal compound or an alkaline earth metal compound. Further, bis-carbonic acid aryl esters of an organic dihydroxyl compound can be used instead of a mixture of equivalent amounts of diaryl carbonate and organic dihydroxy compounds, if desired.

In the reaction of the diaryl carbonate with the dicarboxylic acid and the dihydroxy containing compound, the phenyl groups of the diaryl carbonate do not become incorporated into the polymer, but are distilled off as phenol which is present quantitatively as a result of the reaction. Further, in the exchange of dicarboxylic acid, dihydroxyl containing compound and diaryl carbonate, a homopolyester is obtained which only contains carboxylate groups if the molar ratio of dicarboxylic acid to dihydroxyl containing compound to diaryl carbonate is 1:1:2. In such a case, each carboxylate group of the dicarboxylic acid reacts with a mol of diaryl carbonate to form the corresponding carboxylic acid aryl ester; the ester, when reacted with the organic compound containing two hydroxyl groups, changes into a high molecular weight homopolyester.

Copolyesters which contain carbonate as well as carboxylate groups are exclusively obtained when, in addition to the above defined quantities of the reaction components for the production of homopolyesters, additional quantities of organic compound containing two hydroxyl groups and diaryl carbonate are added which are in a ratio of 1:1.

Consequently, it can be readily ascertained that if a mixture of reactants is used wherein the amount of carboxylic acid groups present is equal to the amount of hydroxyl groups present, the polymer will contain esterified residues of the carboxylic acid only. However, if a mixture of reactants is used wherein the quantity of hydroxyl groups present is greater than the quantity of carboxylic acid groups present, the polymer will contain esterified carbonic acid residues corresponding to the excess of hydroxyl groups over the carboxylic acid groups, as well as esterified residues of the carboxylic acid.

Any suitable alkali metal compound or alkaline earth metal compound can be used in a catalytic amount in a preferred embodiment of the invention. Examples of such compounds are alkali metals, alkali metal oxides, alkali metal hydrides, alkali metal hydroxides, alkali metal alcoholates, alkali metal phenolates, alkali metal acylates, alkali metal carbonates, alkali metal primary, secondary and tertiary phosphates, alkali metal borates, alkaline earth metals, alakaline earth metal oxides, alkaline earth metal hydrides, alkaline earth metal hydroxides, alkaline earth metal alcoholates, alkaline earth metal acylates, alkaline earth metal carbonates and alkaline earth metal primary, secondary and tertiary phosphates and alkaline earth metal borates. As special compounds of this kind, there may be mentioned, for instance, magnesium chips, calcium, lithium oxide, barium oxide, lithium hydride, calcium hydride, sodium hydride, strontium hydroxide, sodium methylate, potassium tert. butylmagnesium stearate, lithium benzoate, potassium carbon sodium phenolate, magnesium phenolate, sodium acetate, magnesium stearate, lithium benzoate, potassium carbonate, barium carbonate, primary, secondary and tertiary sodium phosphate, sodium borate and magnesium borate.

Any catalytic amount of the catalyst can be used but it is ordinarily preferred to use from about 0.0005 to about 1 mol percent based on the mol percentage of dicarboxylic acid or hydroxy carboxylic acid in the reaction mixture. Best results have been obtained with a catalyst content in the reaction mixture of from about 0.005 mol percent to about 0.1 mol percent based on the amount of carboxylic acid in the reaction mixture.

It is surprising that, even in the presence of alkali metal compounds or alkaline earth metal compounds, high molecular weight polyesters of bright color result since diaryl carbonates undergo a Kolbe-Schmidt rearrangement in the presence of catalytic amounts of alkali metal or alkaline earth metal compounds and long heating. Further, diaryl carbonates are subject to non-uniform decomposition reactions in which they decompose into aromatic hydroxy compounds, diaryl ethers and carbon dioxide, for example. It would appear, however, that the reaction of carboxylic acids with diaryl carbonates and the formation of polyester proceeds so quickly that the above-mentioned side reactions are substantially completely avoided.

Any suitable dicarboxylic acid can be used in preparing polyesters in accordance with this invention. The dicarboxylic acid can be a saturated or unsaturated aliphatic compound or it can be an aromatic dicarboxylic acid. Examples of suitable acids include adipic acid, succinic acid, maleic acid, pimelic acid, suberic acid, azelaic acid, sebacic acid, dodecane dicarboxylic acid, dimerized unsaturated fatty acids such as those from linoleic acid, soya bean oil fatty acid, and the like, furthermore isophthalic acid, terephthalic acid, naphthalene dicarboxylic acid-1,8, 4,4'-diphenyl dicarboxylic acid, 2,2-(4,4'-dicarboxy-diphenyl)-propane and the like.

Although the process of this invention is most advantageous for the preparation of a polyester from an aromatic dihydroxy compound, it is also adaptable to the production of polyesters from aliphatic diols. Suitable dihydroxy compounds include butane-1,4-diol, pentane-1,5-diol, ethylene glycol, hexane-1,6-diol, various polyethylene glycols including diethylene glycol, triethylene glycol and the like, polypropylene glycol, such as tripropylene glycol and the like, 2,2-bis-(4,4'-beta-hydroxyethoxyphenyl) - propane, bis-(4,4'-beta-hydroxyethoxyphenyl)-methane, hydroquinone, resorcinol, dihydroxy diphenyl, dihydroxy diaryl alkanes, such as, for instance, dihydroxy diphenyl methane, 2,2'-dihydroxy-5,5'-diisopropyl diphenyl methane, 2,2-(4,4'-dihydroxy diphenyl)-propane, and 1,1-(4,4'-dihydroxy diphenyl)-ethane, dihydroxy diaryl sulfones, such as, for instance, 4,4'-dihydroxy diphenyl sulfone, dihydroxy diaryl sulfoxides such as, for instance, 4,4'-dihydroxy diphenyl sulfoxide, dihydroxy diaryl sulfides, such as for instance, 2,2'-dihydroxy-5,5'-diisopropyl diphenyl sulfide and 4,4'-dihydroxy diphenyl sulfide, the corresponding dihydroxy diaryl ethers, and halogenate aromatic dihydroxy compounds such as, for instance, tetrachlorohydroquinone, 2,2 - (4,4' - dihydroxy-3,3',5,5'-tetrachloro diphenyl)-propane, 4,4'-dihydroxy-3,3'-dichloro diphenyl, and 2,2'-dihydroxy-3,3',5,5'-tetrachloro diphenyl methane.

Any suitable hydroxy carboxylic acid can be used instead of the dicarboxylic acid or in admixture therewith, such as, for instance, omega-hydroxy capronic acid, omega-hydroxy undecane carboxylic acid, p-hydroxybenzoic acid, 4-hydroxyphenyl acetic acid, 4-hydroxyphenyl acetic acid, 4-hydroxy methyl benzoic acid, 5-hydroxy naphthoic acid and the like.

Any suitable diaryl carbonate such as, for example, diphenyl-carbonate, dicresyl carbonate, bis-(2,4-diethyl phenyl)-carbonate, bis-(4-tert.-butyl phenyl)-carbonate, bis-(4-cyclohexyl phenyl)-carbonate, bis-beta-naphthyl carbonate, bis-(2,4-dichlorodiphenyl)-carbonate and bis-(4-chlorophenyl)-carbonate and the like, may be used. Any suitable bis-carbonic acid aryl ester of a dihydroxy compound such as, for example, bis-carbonic acid phenyl esters of resorcinol (melting point 123–125° C.), 2,2-(4,4'-dihydroxy diphenyl)-propane (melting point 102–104° C.), and 1,1-(4,4'-dihydroxy diphenyl)-cyclohexane, may be used.

In most instances, from about 2 to about 4 mols and preferably from about 2 to about 3.15 mols diaryl carbonate are used per mol of dicarboxylic acid or hydroxy carboxylic acid and per 1 to 2 mols of the organic dihydroxy compound. It is preferred to heat the reactants together in the absence of oxygen, preferably in an apparatus which has been purged with an inert gas such as, for example, nitrogen, argon or the like. Best results are obtained if the mixture is stirred and heated under reflux conditions at a temperature from about 100° C. to about 350° C., and preferably from about 200° C. to about 300° C. The reactants are heated to the aforesaid temperature until there is no further evidence of carbon dioxide evolution and the reaction is then preferably maintained at about 150° C. to about 200° C. until the phenol which is formed in the reaction has been distilled from the reaction mixture. The distillation of the phenol is preferably conducted under a pressure which drops slowly from about 760 mm. Hg to about 12 mm. Hg. After all of the phenol has been distilled from the reaction mixture, the temperature is gradually increased to about 280° C. at a pressure of 1 mm. Hg to remove the last traces of phenol and any diaryl carbonate remaining in the reaction mixture, and a highly viscous melt of the high molecular weight polyester is thereby obtained. It is noted here that any diaryl carbonate distilled off at this stage of the reaction represents the slight excess of diaryl carbonate preferably employed in the reaction used in accordance with a preferred embodiment of the inventive process as aforesaid. In fact, it has been found that high molecular weight polyesters are obtained most quickly if an excess of up to about 5 mol percent diaryl carbonate is used. If the amount of diaryl carbonate is above a 5 mol percent excess, its removal hinders the preparation of high molecular weight polyesters.

Where pure starting materials are used, this invention provides a one-step process for making a brightly colored polyester and avoids the evolution of hydrogen chloride. The polyesters produced can be used for making coatings such as paints, or can be reacted with other materials such as organic polyisocyanates to make polyurethanes which have various utilities such as, for example, in the fabrication of cushions, rug underlay, shoe heels, and the like.

In order to better describe and further clarify the invention, the following examples are given in which the parts are by weight unless otherwise specified.

EXAMPLE 1

A mixture of about 16.6 parts (about 0.1 mol) isophthalic acid, about 22.8 parts (about 0.1 mol) 2, 2-(4, 4'-dihydroxy diphenyl)-propane and about 45.0 parts (about 0.2 mol+5%) diphenyl carbonate is heated to about 280° C. (bath temperature) with stirring and under reflux in a current of nitrogen. The evolution of carbon dioxide which commences upon reaching about 280° C. is finished after about 2½ hours.

The polyester formation is continued by distilling off the penol under the following temperature and pressure conditions:

30 minutes, 150° C./50 mm. Hg
30 minutes, 180° C./50 mm. Hg
30 minutes, 200° C./50 mm. Hg
30 minutes, 200° C./10–15 mm. Hg
30 minutes, 200° C.–280° C./10–15 mm. Hg
2 hours, 280° C./less than 1 mm. Hg The distillate contains about 37.0 grams phenol and about 2.0 grams diphenyl carbonate.

Upon cooling, the polyester solidifies to a light brown transparent mass. Yield about 35.5 grams; relative viscosity about 1.252 (measured in about 0.5 methylene chloride solution); second order transition point about 175° C. (measured by a refractometer).

The product can be worked up to threads, bristles, fibers, films and other formed bodies from melts or solutions.

EXAMPLE 2

A mixture of about 14.6 parts (about 0.1 mol) adipic acid, about 22.8 parts (about 0.1 mol), 2,2-(4,4'-dihydroxy diphenyl)-propane, about 45.0 parts (about 0.2 mol+5 %) diphenyl carbonate and about .001 part lithium hydroxide is heated to about 250° C. (bath temperature) with stirring and under reflux in a current of nitrogen. Above about 220° C. a vigorous evolution of carbon dioxide commences and the phenol formed boils under reflux. After three hours, the evolution of carbon dioxide is finished.

The condensation of the polyester is continued under the conditions set out in Example 1.

About 37.5 grams phenol and about 1.8 grams diphenyl carbonate are distilled off. The polyester solidifies upon cooling to a transparent yellow-brown mass. Yield about 33.9 grams; relative viscosity about 1.204 (measured in about 0.5% methylene chloride solution); second order transition point about 56° C.

The product can be worked up in the manner described in Example 1.

EXAMPLE 3

A mixture of about 22.83 parts 2,2-(4,4'-dihydroxy about 6.65 parts isophthalic acid, about 31.49 parts diphenyl carbonate and about .001 part potassium hydroxide is heated to about 280° C. (bath temperature) in a current of nitrogen with stirring and under reflux. After a few minutes, a vigorous evolution of carbon dioxide commences and the phenol begins to distill under reflux. After two hours the evolution of carbon dioxide is finished. The reaction mixture is cooled to about 150° C.

The condensation of the reaction mixture to the polyester is continued under the condition set out in Example 1.

The distillate contains about 26.1–27.0 grams phenol and about 1.0–1.4 grams diphenyl carbonate.

The mixed polyester, which is a viscous fluid at about 280° C., solidifies upon cooling to a tough, bright yellow, transparent mass. Yield about 28.9 grams; relative viscosity about 1.248 (measured in about 0.5% methylene chloride solution); second order transition point about 174° C.

The product can be worked up in the manner described in Example 1.

When using instead of 1.0 milligram potassium hydroxide, 2.0 milligrams sodium phenolate as catalyst same product is obtained.

EXAMPLE 4

The mixture of about 22.83 parts 2,2-(4,4'-dihydroxy diphenyl)-propane, about 4.98 parts terephthalic acid, about 29.23 parts diphenyl carbonate and about .001 part potassium hydroxide is heated to about 300° C. (bath temperature) in a stream of nitrogen with stirring and under reflux. The evolution of carbon dioxide, which commences immediately, is finished after three hours.

The condensation to the mixed polyester is continued as described in Example 1.

About 24.2–24.4 grams phenol and about 1.0–1.1 grams diphenyl carbonate are distilled off. Upon cooling, the mixed polyester solidifies to a yellow transparent tough mass. Yield about 27.9–28.2 grams; relative viscosity about 1.278 (measured in about 0.5% methylene chloride solution); second order transition point about 167° C.

The product can be worked up in the manner described in Example 1.

When using instead of 0.8 milligram potassium hydroxide, 4.0 milligrams sodium borate as catalyst the evolution of carbon dioxide is finished after about 3½ hours. The obtained product is the same.

EXAMPLE 5

A mixture of about 22.83 parts 2,2-(4,4'-dihydroxy diphenyl)-propane, about 2.02 parts sebacic acid, about 24.74 parts diphenyl carbonate and about 0.0003 part magnesium oxide is heated to about 250° C. (bath temperature) in a current of nitrogen with stirring and under reflux. The evolution of carbon dioxide, which commences immediately, is finished after about 1½ hours.

The condensation is continued in the manner described in Example 1.

About 19.8–20.2 grams phenol and about 0.9–1.2 grams diphenyl carbonate are distilled off. The mixed polyester solidifies after cooling to a tough, transparent, pale yellow-colored mass. Yield about 23.5–24.0 grams; relative viscosity about 1.317 (measured in about 0.5 percent methylene chloride solution); second order transition point about 122° C.

The product can be worked up in the manner described in Example 1.

EXAMPLE 6

A mixture of about 10.1 parts (about 0.05 mol) sebacic acid, about 5.9 parts (about 0.05 mol) hexane-1, 6-diol, about 22.5 parts (about 0.1 mol+5%) diphenyl carbonate and about 0.001 part potassium acetate is heated to about 250° C. (bath temperature) in a current of nitorgen with stirring and under reflux. After a few minutes, a vigorous evolution of carbon dioxide commences. After two hours, the reaction mixture is allowed to cool. The reflux condenser is replaced by a Claisen condenser.

With a bath temperature increasing slowly from about 200° C. to about 280° C., about 13.5 grams phenol distill off in the course of ten hours. The evolution of carbon dioxide is finished at the end of this time.

The condensation to the polyester is continued under the following conditions:

½ hour, 150° C., water pump vacuum
½ hour, 150–200° C., water pump vacuum
1 hour, 200–280° C., water pump vacuum
1 hour, 280° C., water pump vacuum
12 hours, 280° C., 0.4 mm. Hg During the condensation, a further about 6.0 grams phenol distill off. The combined distillates contain about 0.9 gram diphenyl carbonate.

The polyester, which is of low viscosity at about 280° C., solidifies upon cooling to an opaque, tough mass. Yield about 27.3 grams; relative viscosity about 1.713 (measured in about 0.5% methylene chloride solution); softening point about 65–68° C.

EXAMPLE 7

A mixture of about 31.7 parts (about 0.1 mol) 2,2-bis-(4,4'-beta-hydroxy ethoxy phenyl)-propane, about 16.6 parts (about 0.1 mol) isophthalic acid, about 45.0 parts (about 0.2 mol+5%) diphenyl carbonate and about 0.0005 part potassium hydroxide is heated to about 280° C. (bath temperature) in a stream of nitrogen with stirring and under reflux. After a short time, a vigorous evolution of carbon dioxide commences and the temperature in the reaction vessel falls slowly due to the formation of phenol which boils under reflux. After three hours, the evolution of carbon dioxide is finished. The temperature in the reaction vessel falls to about 220° C.

The condensation to the polyester is continued as described in Example 1.

The distillate contains about 36.5 grams phenol and about 1.7 grams diphenyl carbonate.

The polyester, which is very viscous in the melt at about 280° C., solidifies upon cooling to a bright yellow, transparent product. Yield about 44.8 grams; relative viscosity about 1.210; second order transition point about 69° C.

The product is worked up in the manner described in Example 1.

EXAMPLE 8

A mixture of about 29.4 parts dimerized fatty acid (acid number about 191), about 21.9 parts diphenyl carbonate, about 11.4 parts 2,2-(4,4'-dihydroxy diphenyl)-propane and about 0.002 part magnesium oxide is heated to about 250° C. (bath temperature) with stirring and under reflux in a current of nitrogen. The vigorous evolution of carbon dioxide, which commences immediately, is finished after two hours. The polycondensation is continued under the following conditions:

1 hour, 135–240° C., 10–15 mm. Hg
1 hour, 240° C., 10–15 mm. Hg
½ hour, 250° C., 0.5 mm. Hg The distillate contains about 18.5 grams phenol and about 0.6 gram diphenyl carbonate. The light brown residue is syrupy. Yield about 39.1 grams; acid number about 19–19. Saponification value about 156–159. The substance is soluble in methylene chloride, lacquer benzene and toluene. A film is painted from about a 4% solution of the substance in toluene containing about 4% cobalt-lead-manganese siccative. After five hours at about 80° C., the drying is finished and an insoluble film with strong adhesion forms.

EXAMPLE 9

A mixture of about 16.0 parts (about 0.07 mol) 2,2-(4,4'-dihydroxy diphenyl)-propane, about 3.3 parts (about 0.03 mol) hydroquinone, about 8.1 parts (about 0.04 mol) sebaic acid, about 31.5 parts (about 0.14 mol+5%) diphenyl carbonate and about 0.0005 part lithium hydroxide is heated to a bath temperature of about 250° C. in a current of nitrogen with stirring under reflux. The evolution of carbon dioxide which commences quickly is finished after two hours.

The condensation to the polyester is continued in the manner described in Example 1.

About 26.1 grams phenol and about 1.2 grams diphenyl carbonate are distilled off. Upon cooling, the mixed polyester solidifies to a yellow transparent mass. Yield about 27.3 grams; relative viscosity about 1.347 (measured in about 0.5% methylene chloride solution); second order transition point about 78–79° C.

The product can be worked up in the manner described in Example 1.

EXAMPLE 10

A mixture of about 13.7 parts (about 0.06 mol) 2,2-(4,4'-dihydroxy diphenyl)-propane, about 7.5 parts (about 0.04 mol) 4,4'-dihydroxy diphenyl, about 8.1 parts (about 0.04 mol) sebacic acid, about 31.5 parts (about 0.14 mol+5%) diphenyl carbonate and about 0.0005 part lithium hydroxide is heated to about 250° C. (bath temperature) in a current of nitrogen with stirring and under reflux. A vigorous evolution of carbon dioxide commences and the phenol formed boils under reflux. After two hours, the evolution of carbon dioxide is finished.

The condensation to the polyester is continued under the conditions described in Example 1.

About 25.9 grams phenol and about 1.1 grams diphenyl carbonate are distilled off. Upon cooling, the mixed polyester solidifies to a bright yellow, tough mass. Yield about 28.7 grams; relative viscosity about 1.406 (measured in about 0.5% methylene chloride solution); second order transition point about 78–79° C.

The product can be worked up in the manner described in Example 1.

If desired, one of the other catalysts disclosed as suitable herein can be substituted in the foregoing working examples. Likewise, any other dicarboxylic acid or omega-hydroxy carboxylic acid can be substituted for the carboxylic acid used in these examples. Moreover, any other organic compound having two hydroxyl groups can be substituted for the one used in the examples. The operating conditions used in these examples can be varied in accordance with the disclosure herein.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for preparing homopolyesters which comprises heating a mixture of dicarboxylic acid, aliphatic or aromatic diol, and diaryl carbonate in a molar ratio of about 1:1:2.

2. The process of claim 1 wherein the mixture of dicarboxylic acid and diol in the molar ratio of 1:1 is wholly or partly replaced by an equivalent amount of omega hydroxy carboxylic acid.

3. The process of claim 1 wherein the heating is carried out in the presence of a catalytic amount of a member selected from the group consisting of alkali metal compounds and alkaline earth metal compounds.

4. The process of claim 3 wherein the mixture of dicarboxylic acid and diol in the molar ratio of 1:1 is wholly or partly replaced by an equivalent amount of omega hydroxy carboxylic acid.

5. The process of claim 3 wherein the amount of catalyst based on the mols of dicarboxylic acid in the reaction mixture is from about 0.0005 to about 1 mol percent.

6. The process of claim 1 wherein the temperature is from about 200° to about 350° C.

7. The process of claim 5 wherein the mixture of dicarboxylic acid and diol in the molar ratio of 1:1 is wholly or partly replaced by an equivalent amount of omega hydroxy carboxylic acid.

8. The process of claim 1 wherein the heating is carried out under reduced pressure.

9. The process of claim 1 wherein the dicarboxylic acid is adipic acid, sebacic acid, isophthalic acid or terephthalic acid; the diol is hexane-1,6-diol, 2,2-bis-(4-beta-hydroxy ethoxy phenyl)-propane, hydroquinone, dihydroxy diphenyl or 2,2-(4,4'-dihydroxy diphenyl)-propane and the diaryl carbonate is diphenyl carbonate.

References Cited

UNITED STATES PATENTS

| 2,964,797 | 12/1960 | Peilstöcker et al. |
| 3,153,008 | 10/1964 | Fox. |
| 3,169,121 | 2/1965 | Goldberg. |

SAMUEL H. BLECH, Primary Examiner

U.S. Cl. X.R.

260—22, 75, 77.5